(12) United States Patent
Park et al.

(10) Patent No.: US 10,009,838 B2
(45) Date of Patent: Jun. 26, 2018

(54) ACCESS POINT CONNECTION METHOD AND ELECTRONIC DEVICE THEREOF

(71) Applicant: Samsung Electronics Co., Ltd., Suwon-si, Gyeonggi-do (KR)

(72) Inventors: Jae-Hyun Park, Seongnam-si (KR); Hey-Young Park, Seoul (KR); Jong-Kyu Bae, Incheon (KR); Je-Hyok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 14/559,223

(22) Filed: Dec. 3, 2014

(65) Prior Publication Data

US 2015/0163734 A1 Jun. 11, 2015

(30) Foreign Application Priority Data

Dec. 5, 2013 (KR) .................. 10-2013-0150700

(51) Int. Cl.
*H04W 48/20* (2009.01)
*H04W 12/12* (2009.01)

(52) U.S. Cl.
CPC .......... *H04W 48/20* (2013.01); *H04W 12/12* (2013.01)

(58) Field of Classification Search
CPC ........................... H04W 48/20; H04W 12/12
See application file for complete search history.

(56) References Cited

U.S. PATENT DOCUMENTS

| 8,086,227 | B2 | 12/2011 | Adya et al. | |
| 2010/0106966 | A1* | 4/2010 | Santos | H04L 12/66 713/156 |
| 2014/0334317 | A1* | 11/2014 | Atreya | H04L 63/14 370/252 |

* cited by examiner

*Primary Examiner* — Walter J Divito
(74) *Attorney, Agent, or Firm* — Jefferson IP Law, LLP

(57) ABSTRACT

An Access Point (AP) connection method in an electronic device and the electronic device thereof are provided. The method includes transmitting a request message relating to AP information connected for wireless Local Area Network (LAN) connection and inquiring about a rogue AP, to an Internet server, when the AP is not the rogue AP according to a response message received from the Internet server, maintaining connection to the AP, and providing other AP information to the Internet server.

16 Claims, 22 Drawing Sheets

| tbl_ap_severity |
|---|
| seqNo: 410 |
| clientVersion: 0.9 |
| deviceId: 356271050036265 |
| bssid: 58:08:fa:00:05:63 |
| ssid: ollehWiFi |
| capabilities: |
| frequency: |
| level: −52 |
| dns1: 168.126.63.1 |
| dns2: 168.126.63.2 |
| gateway: 172.30.1.254 |
| ipAddress: 61.72.83.152 |
| severity: NULL |
| logType: Con |
| detectedSecurityInfo: NULL |
| logcreateTimeStamp: 1381882859115 |
| createTimeStamp: 1381882955074 |

FIG.8

| tbl_ap_info |
|---|
| bssid: 00:07:89:0f:e3:ed |
| ssid: ollehWiFi |
| capabilities: |
| frequency: |
| dns1: 168.126.63.1 |
| dns2: 0.0.0.0 |
| gateway: 172.30.1.254 |
| ipAddress: 110.70.49.135 |
| severity: NULL |
| detectedSecurityInfo: NULL |
| updateTimeStamp: 1382233576809 |
| createTimeStamp: 1382233576809 |

FIG.9

| tbl_ap_scanlist |
|---|
| seqNo: 1 |
| clientVersion: 0.9 |
| bssid: 08:10:76:4c:45:34 |
| ssid: U+Net2383 |
| capabilities: [WPA-PSK-CCMP][WPA2-PSK-CCMP][ESS] |
| frequency: 5 |
| level: |
| logcreateTimeStamp: 1381832232 |
| createTimeStamp: 1381832373167 |

FIG.10

| tbl_ap_severity |
|---|
| bssid: 00:08:9f:ac:94:f4 |
| ssid: CCSL |
| clientVersion: 4.2.2 |
| severity: B |
| updateTimeStamp: 1381987783742 |

FIG.11

• Request Description

| Field Name | Description |
|---|---|
| Uri | ap/{ClientVersion}/{MacAddresses} |
| Method | GET |

• Request Sample

| http://{Hostname}/ap/1.1/00-00-00-00-00-AA |
|---|

FIG.13

• Response Description

| Parameter Name | Type | Description |
| --- | --- | --- |
| resultCode | String | SUCCESS:OK, FAIL : ERROR CODE |
| resultMessage | String | RESULT MESSAGE |
| bssid | String | MAC ADDRESS |
| severity | String | B : BLACKLIST<br>Y : VULNERABLE LIST<br>W: WHITELIST |

• Result Code

| Http Response Code | Description |
| --- | --- |
| 200 | OK |
| 400 | ERROR PROCESSING |
| 500 | ERROR |

• Response Sample

```
{
  "resultCode":"OK",
  "resultMessage":"",
  "bssid":"00-00-00-00-00-AA",
  "severity":"B"
}
```

FIG.14

· Connect AP Info.

| Name | explanation |
|---|---|
| BSSID | BSSID OF THE CONNECTED AP (MAC ADDRESS) |
| HiddenSSID | HIDDEN SSID |
| ipAddress | IP OF AP |
| LinkSpeed | LINK SPEED OF Mpbs |
| MacAddress | WI-FI MAC address in Android |
| rssi | receive signal strength indication |
| SSID | SSID of the connected AP |
| supplicantState | state of supplicant |

FIG.15

• Scan AP Info.

| Name | explanation |
|---|---|
| BSSID | MAC |
| SSID | AP ID |
| capabilities | AUTHENTICATION TYPE (CODING TYPE) |
| frequency | channel |
| level | signal level |
| timestamp | AP set time |

FIG.16

ACCESS POINT CONNECTION METHOD AND ELECTRONIC DEVICE THEREOF

CROSS-REFERENCE TO RELATED APPLICATION(S)

The application claims the benefit under 35 U.S.C. § 119(a) of a Korean patent application filed on Dec. 5, 2013 in the Korean Intellectual Property Office and assigned Serial number 10-2013-0150700, the entire disclosure of which is hereby incorporated by reference.

TECHNICAL FIELD

The present disclosure relates to a method for connecting to an access point in an electronic device, and the electronic device thereof.

BACKGROUND

Typically, various electronic devices, such as smart phones or tablet Personal Computers (PCs), can have a wireless Local Area Network (LAN) function. The wireless LAN establishes a network between computers over radio waves without using a network cable or a telephone line, which is also referred to as Wireless Fidelity (Wi-Fi) indicating that the wireless network is used like Wi-Fi.

A basic unit of the wireless LAN is a Basic Service Set (BSS) including a plurality of nodes, and is classified to an ad-hoc network and an infrastructure. The infrastructure uses an Access Point (AP) in each BSS for connections between BSSs. The AP, which serves as a base station, is connected to a wireless network called a Distribution System (DS) and forms one Extended Service Set (ESS). For example, the wireless LAN includes 802.11b, 802.11a, 82.11g, and the like.

FIG. 1 illustrates electronic devices connected to an AP according to the related art. For example, the electronic device, such as a smart phone or a tablet PC, can be referred to as a terminal in Internet.

Referring to FIG. 1, a first terminal and a second terminal are wirelessly connected to one AP and to an Internet Protocol (IP) network.

The terminal attempts to connect to the AP of an effective Service Set Identifier (SSID) and the highest receive signal level among nearby APs. Accordingly, a hacker who seeks personal information can illegally install a hacking AP. For example, the hacking AP can be referred to as a rogue AP.

FIG. 2 illustrates electronic devices connected to a rogue AP according to the related art.

Referring to FIG. 2, when a second rogue AP is close to a second terminal and receives a signal level that is greater than the receive signal level of a first AP, the second terminal generally connects to the second rogue AP for Wi-Fi.

Hence, user information of the second terminal connected to the IP network via the second rogue AP can be illegally used by a terminal hacker. For example, the user information can include e-mail address and password. Furthermore, the same screen as the second terminal can be displayed to the terminal hacker.

Therefore, a need exists for a method for connecting to an access point in an electronic device, and the electronic device thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for connecting to an access point in an electronic device, and the electronic device thereof.

In accordance with an aspect of the present disclosure, a method for connecting to an Access Point (AP) in an electronic device is provided. The method includes transmitting a request message relating to AP information connected for wireless Local Area Network (LAN) connection and inquiring about a rogue AP, to an Internet server, maintaining, when the AP is not the rogue AP according to a response message received from the Internet server, connection to the AP, and providing other AP information to the internet server.

In accordance with another aspect of the present disclosure, an electronic device is provided. The electronic device includes a communication module configured to connect to an AP and a processor configured to determine whether the communication module is connected to the AP, to transmit a request message relating to AP information connected for wireless LAN connection and to inquire about a rogue AP, to an Internet server, to maintain connection to the AP when the AP is not the rogue AP according to a response message received from the Internet server, and to provide other AP information to the Internet server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates an AP severity table in an AP database according to an embodiment of the present disclosure;

FIG. 9 illustrates an AP information table in an AP database according to an embodiment of the present disclosure;

FIG. 10 illustrates an AP scan-list table in an AP database according to an embodiment of the present disclosure;

FIG. 11 illustrates an AP severity table in a rogue AP database according to an embodiment of the present disclosure;

FIG. 13 illustrates a request message according to an embodiment of the present disclosure;

FIG. 14 illustrates a response message according to an embodiment of the present disclosure;

FIG. 15 illustrates AP information transmitted to an Internet server according to an embodiment of the present disclosure;

FIG. 16 illustrates other AP information transmitted to an Internet server according to an embodiment of the present disclosure;

Throughout the drawings, like reference numerals will be understood to refer to like parts, components, and structures.

DETAILED DESCRIPTION

Figure 1:
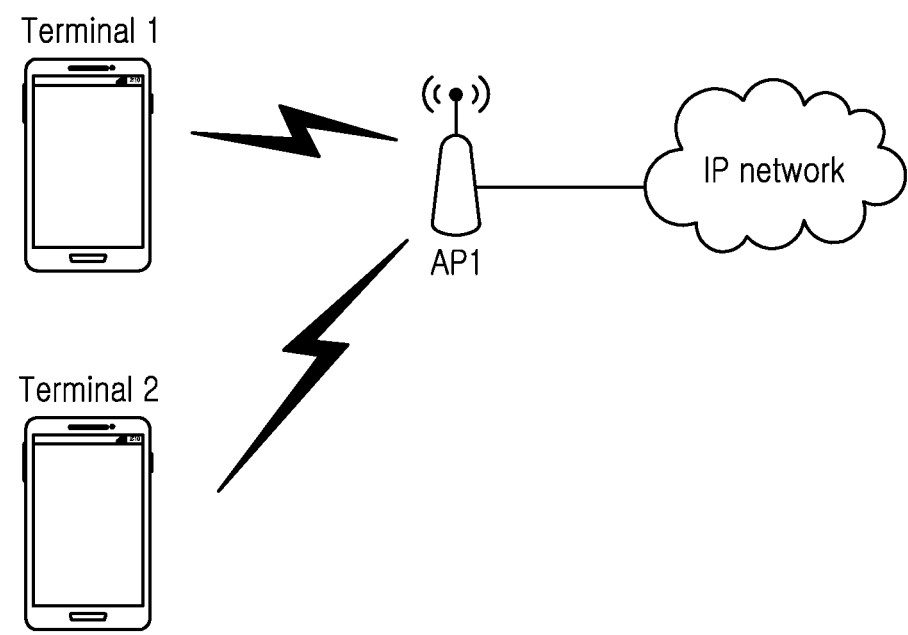
FIG. 1 illustrates electronic devices connected to an Access Point (AP) according to the related art.
Figure 2:
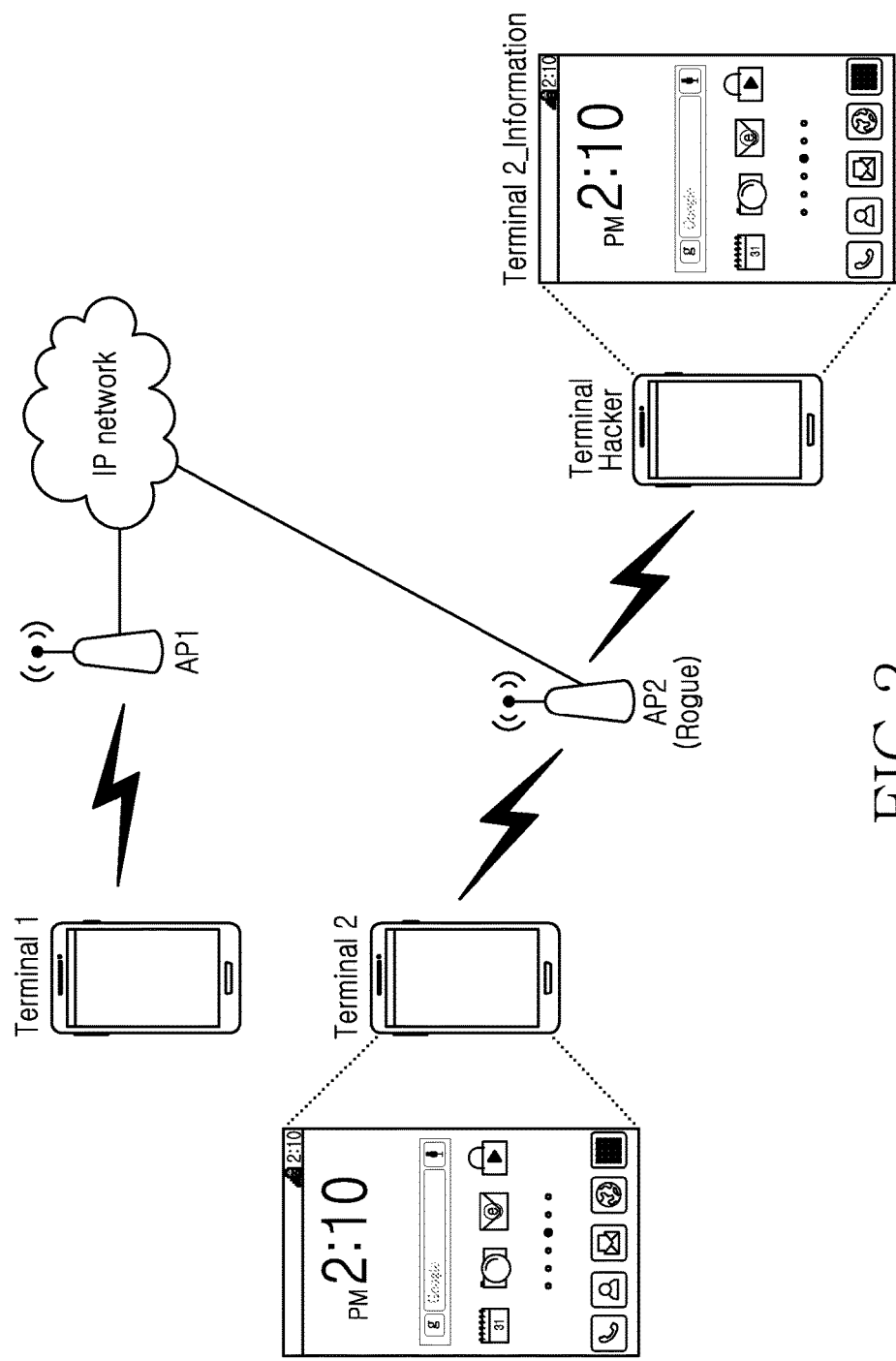
FIG. 2 illustrates electronic devices connected to a rogue AP according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure can employ a device having a communication function. For example, the electronic device can include one or more combinations of various devices including a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical appliance, an electronic bracelet, an electronic necklace, an electronic accessory, a camera, a wearable device, an electronic clock, a wrist watch, a smart white appliance (e.g., a refrigerator, an air conditioner, a vacuum cleaner, an artificial intelligence robot, a television (TV), a Digital Versatile Disc (DVD) player, an audio system, an oven, a microwave oven, a washing machine, an air purifier, a digital frame, and the like), medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), a set-top box, a TV box (e.g., Samsung HomeSync™, AppleTV™, Google TV™), an electronic dictionary, an in-vehicle infotainment, electronic equipment for a ship (e.g., a marine navigation device, a gyro compass, and the like), avionics, a security device, an e-textile, a digital key, a camcorder, a game console, a Head Mounted Display (HMD), a flat panel display device, an electronic album, part of furniture or building/structure having the communication function, an electronic board, an electronic sign input device, and a projector. Those skilled in the art shall understand that the electronic device of the present disclosure is not limited those devices.

Figure 3:
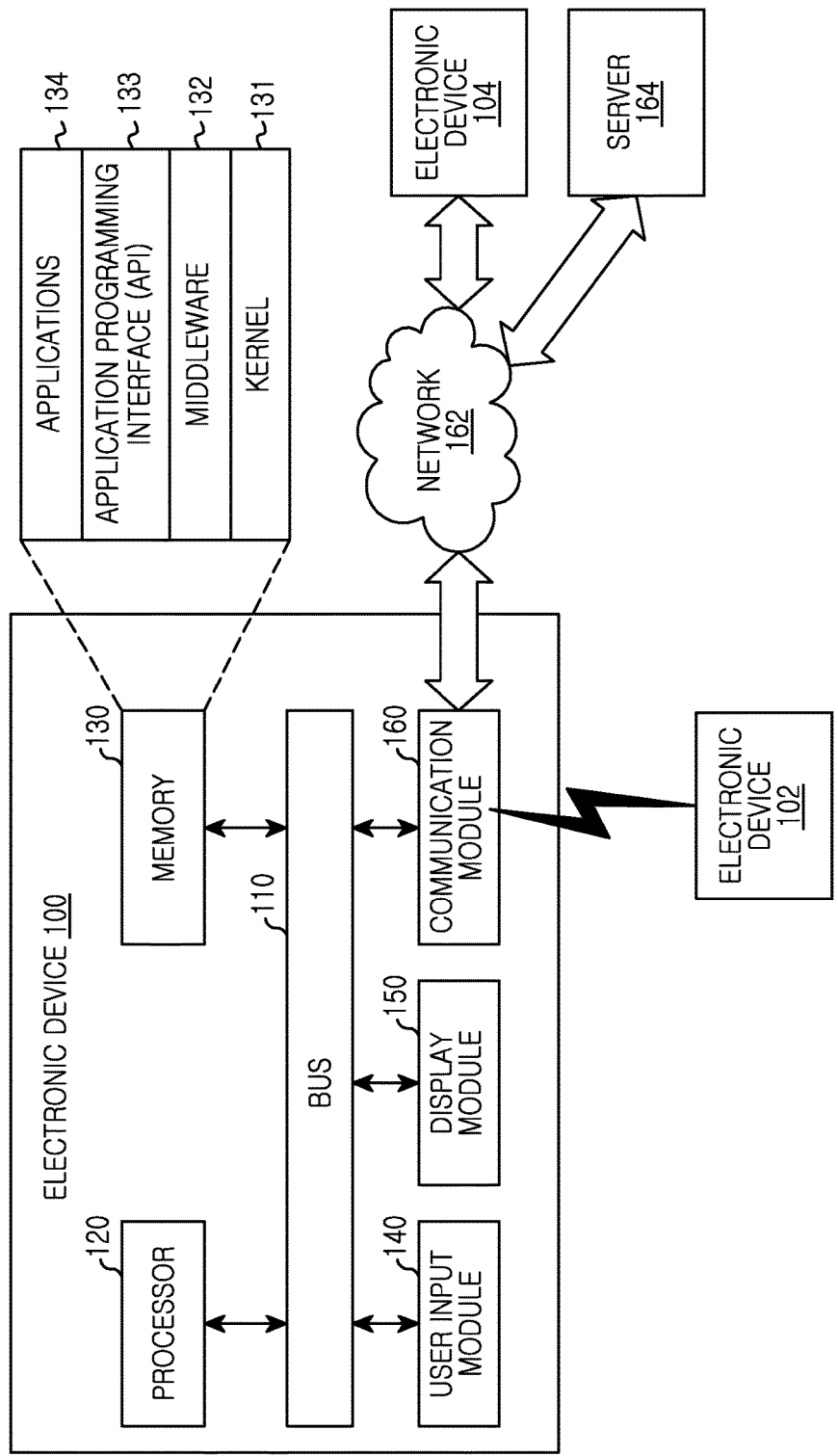
FIG. 3 is a block diagram illustrating an electronic device according to an embodiment of the present disclosure.

FIG. 3 is a block diagram illustrating an electronic device according to an embodiment of the present disclosure.

Referring to FIG. 3, an electronic device 100 can include a bus 110, a processor 120, a memory 130, a user input module 140, a display module 150, and a communication module 160.

The bus 110 can be a circuit for interlinking the above-stated components and transferring communication (e.g., control messages) between the components. The processor 120 can receive an instruction from the components (e.g., the memory 130, the user input module 140, the display module 150, and the communication module 160) via the bus 110, interpret the received instruction, and perform an operation or a data processing according to the interpreted instruction.

The memory 130 can store the instruction or the data received from or generated by the processor 120 or the other components (e.g., the user input module 140, the display module 150, and the communication module 160). For example, the memory 130 can include programming modules including a kernel 131, middleware 132, an Application Programming Interface (API) 133, and an application 134. The programming modules can be implemented using software, firmware, and hardware, or a combination of at least two of them.

The kernel 131 can control or manage system resources (e.g., the bus 110, the processor 120, the memory 130, and the like) used to execute the operation or the function of other programming modules, for example, the middle ware 132, the API 133, and the application 134. The kernel 131 can provide an interface allowing the middleware 132, the API 133, the application 134, and the like, to access and control or manage the individual component of the electronic device 100.

The middleware 132 can relay data between the API 133 or the application 134 and the kernel 131. The middleware 132 can perform load balancing for work requests received from the applications 134 by giving priority of the system resource (e.g., the bus 110, the processor 120, the memory 130, and the like) of the electronic device 100 to at least one of the applications 134.

The API 133, which is an interface for the application 134 to control the kernel 131 or the middleware 132, can include at least one interface or function for file control, window control, image processing, text control, and the like. The user input module 140 can receive and forward the instruction or the data from the user to the processor 120 or the memory 130 via the bus 110. The display module 150 can display an image, a video, data, and the like, to the user.

The communication module 160 can connect the communication between other electronic devices 102 and the electronic device 100. The communication module 160 can support short-range communication protocol (e.g., Wireless Fidelity (Wi-Fi), Bluetooth (BT), Near Field Communication (NFC)), a communication network 162 (e.g., the Internet, a Local Area Network (LAN), a Wire Area Network (WAN), a telecommunication network, a cellular network, a satellite network, or Plain Old Telephone Service (POTS), and the like). The electronic devices 102 and 104 can be the same as or different from the electronic device 100.

Figure 4:
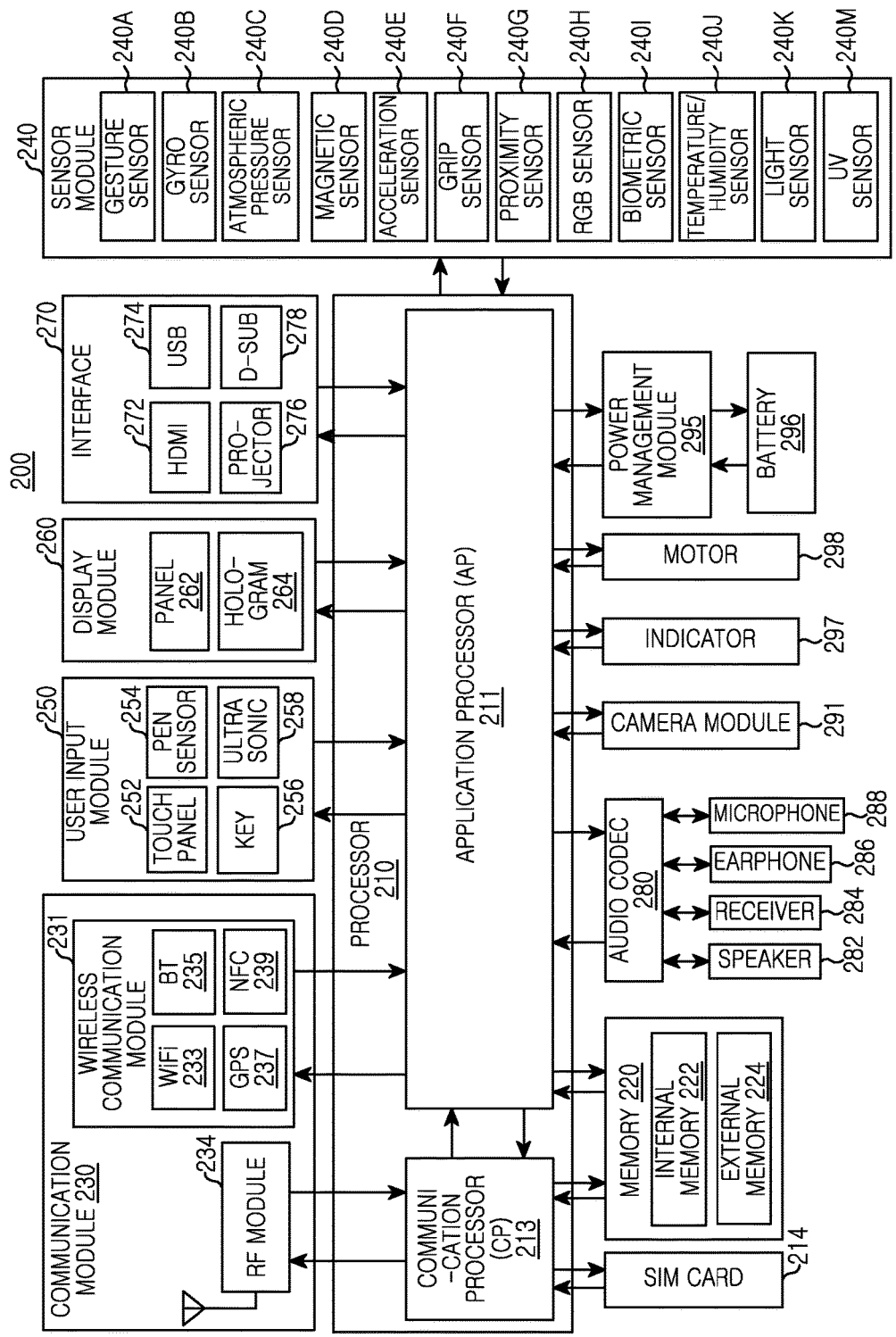
FIG. 4 is a block diagram illustrating hardware according to an embodiment of the present disclosure.

FIG. 4 is a block diagram illustrating hardware according to an embodiment of the present disclosure. Hardware 200 can be, for example, the electronic device 100 of FIG. 3.

Referring to FIG. 4, the hardware 200 can include one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (e.g., the processor 120) can include one or more Application Processor (APs) 211 and one or more Communication Processors (CPs) 213. For example, the processor 210 can be the processor 120 of FIG. 3. While the AP 211 and the CP 213 are included in the processor 210 of FIG. 4, the AP 211 and the CP 213 can be included in different Integrated Circuit (IC) packages. The AP 211 and the CP 213 can be included in a single IC package.

The AP 211 can control hardware or software components connected to the AP 211 by driving an operating system or an application program, and carry out data processing and operations including multimedia data. For example, the AP 211 can be implemented using a System on Chip (SoC). The processor 210 can further include a Graphics Processing Unit (GPU) (not shown).

The CP 213 can manage data links and convert a communication protocol in the communication between the electronic device (e.g., the electronic device 100) including the hardware 200 and the other electronic devices connected over the network. For example, the CP 213 can be implemented using a System on Chip (SoC). The CP 213 can perform at least part of the multimedia control function. The CP 213 can identify and authenticate a terminal in the communication network using the SIM card 214. In so doing, the CP 213 can provide the user with a service including voice telephony, video telephony, text message, and packet data.

The CP 213 can control the data transmission and reception of the communication module 230. While the components of the CP 213, the power management module 295, and the memory 220 are separated from the AP 211 in FIG. 4, the AP 211 can include part (e.g., the CP 213) of those components. The AP 211 or the CP 213 can load and process the instruction or the data received from its non-volatile memory or at least one of the other components, in a volatile memory. The AP 211 or the CP 213 can store data received from or generated by at least one of the other components, in the non-volatile memory.

The SIM card 214 can be inserted to a slot formed at a specific location of the electronic device. The SIM card 214 can contain unique identification information (e.g., Integrated Circuit Card Identifier (ICCID)) or subscriber information (e.g., International Mobile Subscriber Identity (IMSI)).

The memory 220 can include an internal memory 222 and an external memory 224. For example, the memory 220 can be the memory 130 of FIG. 3. The internal memory 222 can include at least one of the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, NOR flash memory).

The internal memory 222 may employ a Solid State Drive (SSD). The external memory 224 can further include, for example, a Compact Flash (CF), a Secure Digital (SD), a Micro-SD, a Mini-SD, an extreme digital (xD), and a memory stick.

The communication module 230 can include a wireless communication module 231 and a Radio Frequency (RF) module 234. For example, the communication module 230 can be the communication module 160 of FIG. 3. For example, the wireless communication module 231 can include a Wi-Fi 233, a BT 235, a GPS 237, and an NFC 239. For example, the wireless communication module 231 can provide a wireless communication function using a radio frequency. Additionally, the wireless communication module 231 can include a network interface (e.g., a LAN card) or a modem for connecting the hardware 200 to the network (e.g., the Internet, a LAN, a WAN, a telecommunication network, a cellular network, a satellite network, a POTS, and the like).

The RF module 234 can transmit and receive the data, for example, an RF signal or a paged electric signal. For example, the RF module 234 can includes a transceiver, a Pulse Amplitude Modulation (PAM), a frequency filter, or a Low Noise Amplifier (LNA) which are not shown. The RF module 234 can further include a component, for example, a conductor or a conducting wire for transmitting and receiving electromagnetic waves in free space in the wireless communication.

The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red Green Blue (RGB) sensor 240H, a biometric sensor 240I, a temperature/humidity sensor 240J, a light sensor 240K, and an UltraViolet (UV) sensor 240M. The sensor module 240 can measure a physical quantity or detect the operation status of the electronic device, and convert the measured or detected information to an electric signal.

Additionally, the sensor module 240 can include an E-noise sensor (not shown), an electromyography (EMG) sensor (not shown), an electroencephalogram (EEG) sensor (not shown), an electrocardiogram (ECG) sensor (not shown), or a finger print sensor. The sensor module 240 can further include a control circuit for controlling its one or more sensors.

The user input module 250 can include a touch panel 252, a (digital) pen sensor 254, a key 256, and an ultrasonic input device 258. For example, the user input module 250 can be the user input module 140 of FIG. 3. The touch panel 252 can recognize the touch input using at least one of capacitive, resistive, infrared, and Surface Acoustic Wave (SAW) techniques.

The touch panel 252 may further include a controller (not shown). The capacitive touch panel can recognize not only the direct touch but also the proximity. The touch panel 252 may further include a tactile layer. In this case, the touch panel 252 can provide a tactile response to the user. The (digital) pen sensor 254 can be implemented using the same or similar method as or to the user touch input, or using a separate recognition sheet. For example, the key 256 can include a keypad or a touch key.

The ultrasonic input device 258 obtains data by detecting microwave through a microphone (e.g., a microphone 288) in the electronic device through the pen which generates an ultrasonic signal, and allows radio frequency identification. The hardware 200 may receive the user input from an external device (e.g., a network, a computer, a server 164, and the like) connected using the communication module 230.

The display module 260 can include a panel 262 or a hologram 264. For example, the display module 260 can be the display module 150 of FIG. 3. The panel 262 can employ a Liquid Crystal Display (LCD) or an Active Matrix Organic Light Emitting Diode (AMOLED). For example, the panel 262 can be implemented flexibly, transparently, or wearably.

The panel 262 may be constructed as a single module with the touch panel 252. The hologram 264 can present a three-dimensional image in the air using interference of light. The display module 260 can further include a control circuit for controlling the panel 262 or the hologram 264.

The interface 270 can include, for example, a High Definition Multimedia Interface (HDMI) 272, a Universal Serial Bus (USB) 274, a projector 276, and a D-sub 278. Additionally, the interface 270 can include, for example, a SD/Multi-Media Card (MMC) (not shown) or IrDA (not shown).

The audio codec 280 can convert the voice to an electric signal and vice versa. For example, the audio codec 280 can convert voice information which is input or output through a speaker 282, a receiver 284, an earphone 286, or the microphone 288.

The camera module 291 can capture a still picture and a moving picture, and include one or more image sensors (e.g., front lens or rear lens), an Image Signal Processor (ISP) (not shown), a flash LED (not shown), and the like.

The power management module 295 can manage power of the hardware 200. For example, the power management module 295 can include, for example, a Power Management IC (PMIC), a charging IC, or a battery gauge which are not shown. The PMIC can be mounted in an IC or a SoC semiconductor. The charging type can be divided to a wired type and a wireless type. The charging IC can charge the battery and prevent overvoltage or overcurrent from flowing from a charger.

The charging IC can include a charging IC for at least one of the wired charging type or the wireless charging type. For example, the wireless charging type includes magnetic resonance, magnetic induction, and microwave, and can further include an additional circuit, for example, coil loop, resonance circuit, rectifier circuit for the wireless charging. The battery gauge can measure the remaining capacity of the battery 296 and the voltage, the current, or the temperature of the charging. The battery 296 can supply the power by generating the electricity. For example, the battery 296 can be a rechargeable battery.

The indicator 297 can display a specific status, for example, a booting state, a message state, or a charging state of the hardware 200 or part (e.g., the AP 211) of the hardware 200. The motor 298 can convert the electric signal to a mechanic vibration. A Micro Controller Unit (MCU) (not shown) can control the sensor module 240. Although it is not illustrated, the hardware 200 can further include a processor (e.g., a GPU) for supporting mobile TV. For example, the processor for supporting the mobile TV can process media data in conformity with Digital Multimedia Broadcasting (DMB), Digital Video Broadcasting (DVB), or media flow standard.

The names of the hardware components of the present disclosure can differ according to the type of the electronic device. The hardware of the present disclosure can include at least one of the components, omit some components, or further include other components. Some of the hardware components can be united to the single entity to carry out the same functions of the corresponding components.

Figure 5:
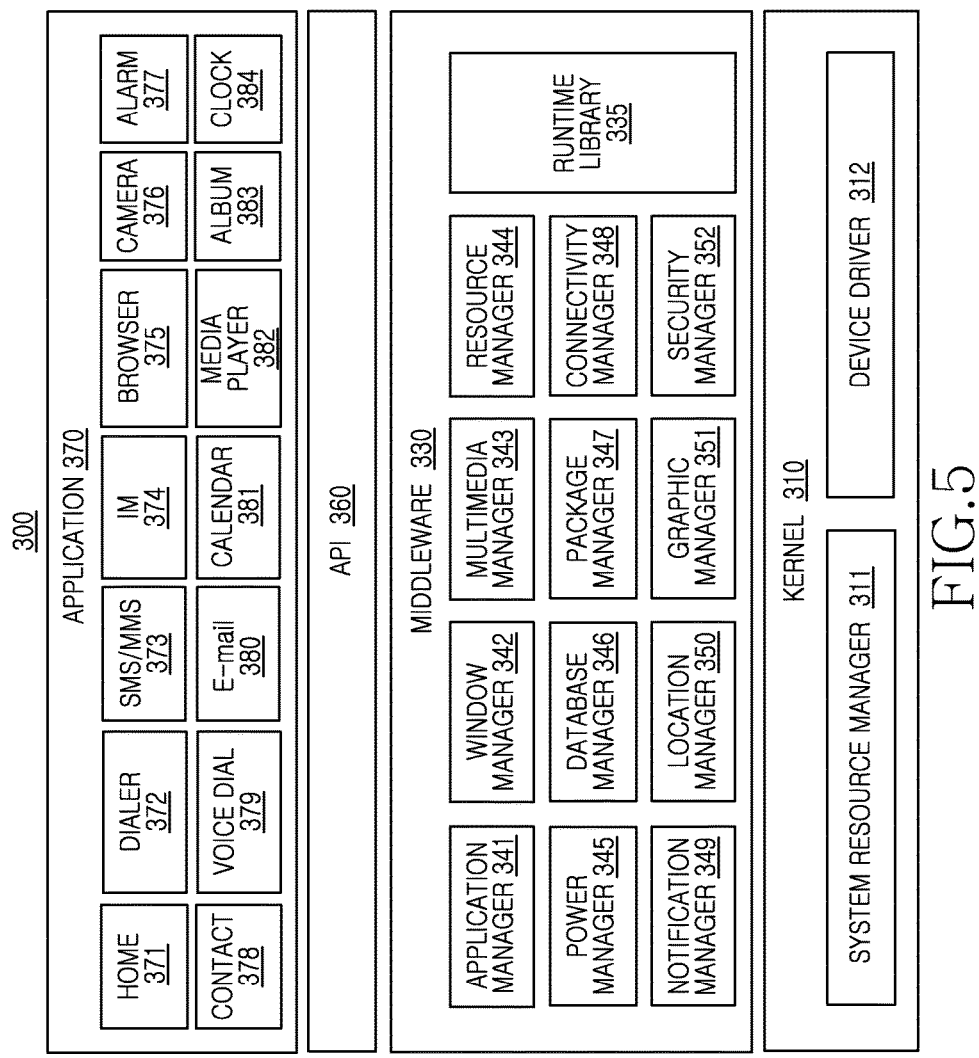
FIG. 5 is a block diagram illustrating a programming module according to an embodiment of the present disclosure.

FIG. 5 is a block diagram illustrating a programming module according to an embodiment of the present disclosure. A programming module 300 can be included (e.g., stored) in the electronic device 100 (e.g., the memory 130) of FIG. 3. At least part of the programming module 300 can include software, firmware, hardware, or a combination of at least two of them.

Referring to FIG. 5, the programming module 300 can include an Operating System (OS) for controlling resources of the electronic device (e.g., the electronic device 100) in the hardware 200, and various applications (e.g., an application 370) driven on the OS. For example, the OS can include Android, iOS, Windows, Symbian, Tizen, and Bada. Moreover, the programming module 300 can include a kernel 310, a middleware 330, an API 360, and the application 370.

The kernel 310 (e.g., the kernel 131) can include a system resource manager 311 and a device driver 312. The system resource manager 311 can control, allocate, or reclaim the system resource. The device driver 312 can include an Inter-Process Communication (IPC) driver (not shown). The middleware 330 can include a plurality of preset modules for providing the common function used by the application 370. The middleware 330 can allow the application 370 to efficiently use the limited system resources of the electronic device through the API 360.

For example, as shown in FIG. 5, the middleware 330 (e.g., the middleware 132) can include at least one of a runtime library 335, an application manager 341, a window manager 342, a multimedia manager 343, a resource manager 344, a power manager 345, a database manager 346, a package manage 347, a connectivity manager 348, a notification manager 349, a location manager 350, a graphic manager 351, and a security manager 352.

The runtime library 335 can include, for example, a library module used by a compiler to add a new function using a programming language while the application 370 is executed. The runtime library 335 can function for input/output, memory management, and arithmetic function. The application manager 341 can manage, for example, a life cycle of at least one of the application 370. The window manager 342 can manage GUI resources used in the screen.

The multimedia manage 343 can identify a format used to play various media files, and encode or decode the media file using a codec suitable for the corresponding format. The resource manager 344 can manage a source code, a memory, a storage space of at least one of the application 370. The power manager 345 can manage the battery or the power in association with BIOS, and provide power information for the operation. The database manager 346 can manage to generate, retrieve, or change a database to be used by at least one of the application 370.

The packet manager 347 can manage installation or update of the application distributed as a packet file. The connectivity manager 348 can manage, for example, the wireless connection of the Wi-Fi or the BT. The notification manager 349 can display or notify an event of an incoming message, an appointment, and proximity to the user without interruption. The location manager 350 can manage location information of the electronic device.

The graphic manager 351 can manage graphical effect for the user or its related user interface. The security manager 352 can provide a security function for the system security or the user authentication. When the electronic device (e.g., the electronic device 100) has a call function, the middleware 330 can further include a telephony manager (not shown) for managing the voice or video call function of the electronic device.

The middleware 330 can generate and use a new middleware module by combining various functions of the internal component modules. The middleware 330 can provide a specialized module per OS so as to provide a differentiated function. The middleware 330 can dynamically remove some components or add new components. Hence, the embodiments of the present disclosure can omit some of the components, include other components, or replace with other components of similar functions.

The API 360 (e.g., the API 133), which is a set of API programming functions, can differ according to the OS. For example, in Android and iOS, one API set can be provided per platform. In Tizen, one or more API sets can be provided. The application 370 (e.g., the application 134) can include, for example, a preload application or a third party application.

The application 370 can include at least one of a home 371, a dialer 372, a Short Messaging Service (SMS)/Multimedia Messaging Service (MMS) 373, an Instant Messenger (IM) 374, a browser 375, a camera 376, an alarm 377, a contact 378, a voice dial 379, an e-mail 380, a calendar 381, a media player, 382, an album 383, and a clock 384.

At least part of the programming module 300 can be implemented using an instruction stored in computer-readable storage media. When the one or more processors (e.g., the processors 210) execute the instruction, it or they can perform the function corresponding to the instruction. The computer-readable storage medium can be the memory 260. Part of the programming module 300 can be realized (e.g., executed) by the processors 210. Part of the programming module 300 can include a module, a program, a routine, an instruction set, or a process for one or more functions.

The names of the components of the programming module (e.g., the programming module 300) can differ according to the type of the OS. The programming module can include at least one of the components, omit some components, or further include other components.

A method of the electronic device for connecting to the AP, and the electronic device are elucidated below. The electronic device can include the components of FIG. 4. The processor 210 of the electronic device conducts the wireless LAN function according to a user request by controlling the communication module 230, the CP 213, and the AP 211. For example, by controlling the communication module 230, the processor 210 connects to an AP, interfaces with the Internet server over the Internet Protocol (IP) network, and determines whether the connected AP is the rogue AP of the hacker, which is illegally installed.

When determining the rogue AP, the processor 210 controls the communication module 230 to disconnect from the rogue AP and to attempt the connection to other AP. By contrast, when determining no rogue AP, the processor 210 maintains the connection to the AP and provides the Internet server with not only first AP information but also other nearby AP information. The other AP information can be obtained by scanning the AP to connect using the wireless LAN function.

The Internet server collects the AP information from the electronic device, stores the AP information in its database, analyzes the AP information, and extracts rogue AP information. Thus, the Internet server can provide a warning message even to other electronic device connected to the rogue AP, or remotely disconnect from the rogue AP. The Internet server can be operated, for example, as a single integrated server or as a second Internet server separated from a first Internet server. The AP information collected from the electronic device is managed in a first database, and the rogue AP information analyzed and retrieved based on the first database can be managed in a second database.

The first database and the second database may be integrated or divided into three or more databases. Hereafter, the Internet server is divided into a first Internet server and a second Internet server, and the database is divided into a first database (DB) and a second DB.

Figure 6:
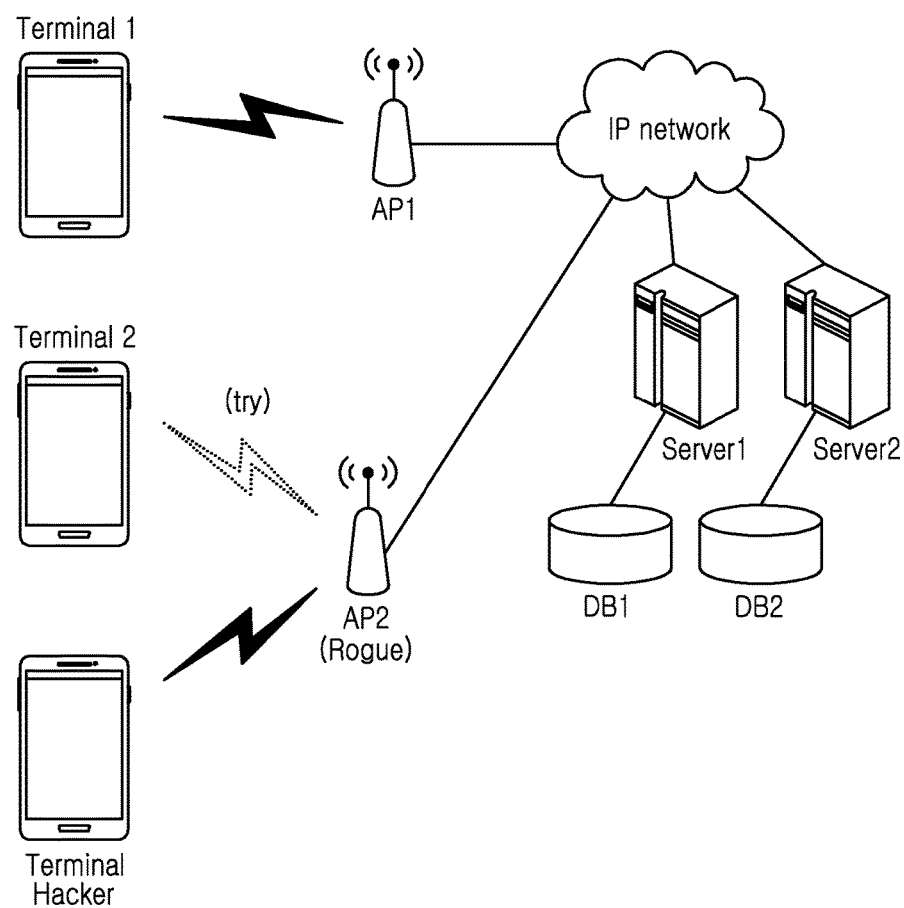
FIG. 6 illustrates an electronic device for attempting to connect to a rogue AP according to an embodiment of the present disclosure.
Figure 7:
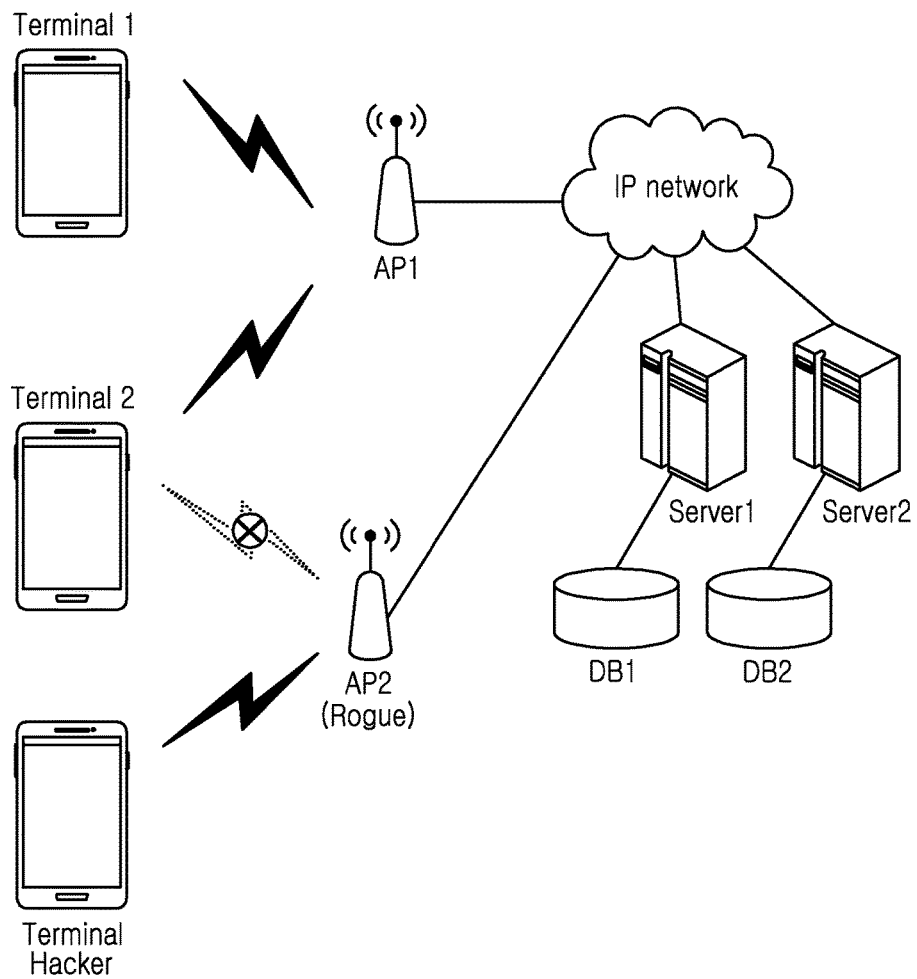
FIG. 7 illustrates an electronic device for disconnecting from a rogue AP according to an embodiment of the present disclosure.

FIG. 6 illustrates an electronic device for attempting to connect to a rogue AP according to an embodiment of the present disclosure. FIG. 7 illustrates an electronic device for disconnecting from a rogue AP according to an embodiment of the present disclosure. For example, the electronic device, such as a smart phone or a tablet PC, can be referred to as the terminal in the IP network.

Referring to FIGS. 6 and 7, a first terminal can be connected to the IP network via a first nearby AP, and a second terminal can attempt to connect to a second AP which is the rogue AP illegally installed. For example, for the wireless LAN function, the second terminal connects to the second AP and transmits a request message inquiring about the second AP information and the rogue AP to the first Internet server connected over the IP network.

The first Internet server compares the second AP information and the rogue AP information stored in the first DB, and transmits a response message corresponding to the request message to the second terminal. For example, the first Internet server notifies the response message for identifying the rogue AP, and can be referred to as a notification server. Based on the response message received from the first Internet server, the second terminal determines whether the second AP is the rogue AP. When confirming the rogue AP, the Internet server disconnects from the second AP as shown in FIG. 7. Thus, the illegal exposure of the second terminal user information to the terminal hacker can be prevented.

The second terminal can store the rogue AP information in a memory, and exclude the rogue AP from the connection target in advance based on the rogue AP information stored in the memory in case of the AP connection retrial. When the second terminal is connected to the first AP and the IP network as shown in FIG. 7, the second terminal provides to the second Internet server not only the first AP information but also other access information acquired in the AP scanning.

The second Internet server collects and stores the first AP information and the other AP information from the second terminal, in the second DB. For example, the second Internet server collects and stores the AP information in the second DB, and can be referred to as a collection server. The first DB, which stores the rogue AP information, can be referred to as a rogue AP DB. The second DB, which stores the AP information, can be referred to as an AP DB.

FIG. 8 illustrates an AP severity table in an AP DB according to an embodiment of the present disclosure.

FIG. 9 illustrates an AP information table in an AP DB according to an embodiment of the present disclosure.

FIG. 10 illustrates an AP scan list table in an AP DB according to an embodiment of the present disclosure.

Referring to FIG. 8, the AP DB being the first DB can store, for example, a table AP severity including a seqNo, a ClientVersion, a deviceID, a Basic Service Set Identifier (BSSID), an SSID, capabilities, a frequency, a level, a Domain Name System 1 (DNS1), a DNS2, a gateway, an IP address, a severity, a logtype, detectedSecurityInfo, a logcreateTimestamp, and a createTimestamp, as the AP information.

Referring to FIG. 9, the AP DB can store, for example, tbl AP info including BSSID, SSID, capabilities, frequency, DNS1, DNS2, gateway, IP address, severity, detectedSecurityInfo, updateTimestamp, and createTimestamp.

Referring to FIG. 10, the AP DB can store, for example, a tbl AP scanlist including a seqNo, a clientVersion, a BSSID, an SSID, capabilities, a frequency, a level, a logcreateTimestamp, and a createTimestamp.

The tbl AP info corresponds to the AP information connected to the terminal, and the tbl AP scanlist corresponds to the nearby AP information acquired by scanning the connection target in the terminal. The second Internet server generates and manages the tbl AP severity by collecting and analyzing the tbl AP info and the tbl AP scanlist, and thus manages and updates the AP information in the big-data DB.

FIG. 11 illustrates an AP severity table of a rogue AP DB according to an embodiment of the present disclosure.

Referring to FIG. 11, the rogue AP DB being the first DB can store the tbl AP severity including, for example, a BSSID, an SSID, a clientVersion, a severity, and an updateTimestamp, as the rogue AP information.

The first Internet server retrieves and analyzes data for identifying the rogue AP inquired from the terminal, in the AP DB and stores the data in the rogue AP DB. Thus, the rogue AP information can be managed and updated in the big-data DB.

Figure 12:
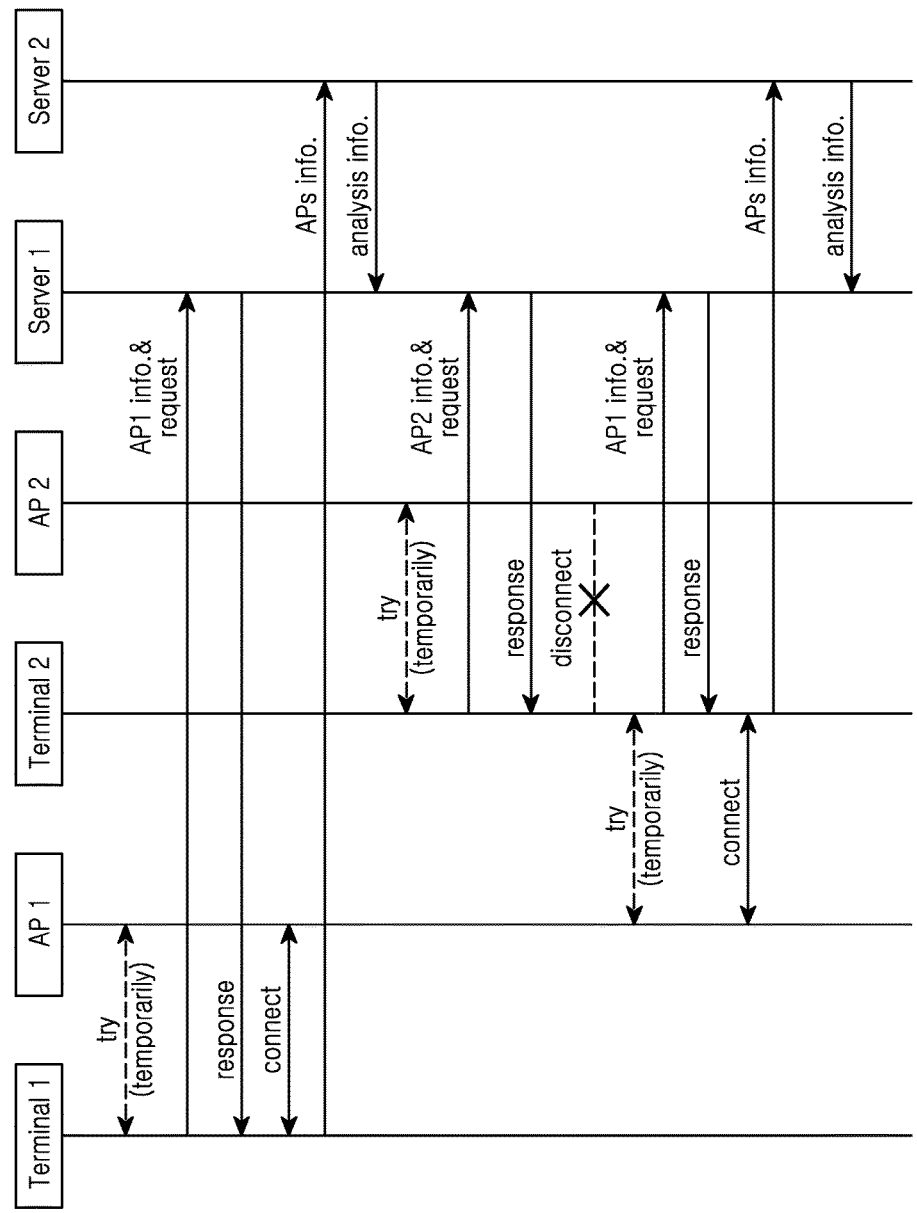
FIG. 12 illustrates disconnection from a rogue AP according to an embodiment of the present disclosure.

FIG. 12 illustrates disconnection from a rogue AP according to an embodiment of the present disclosure.

Referring to FIGS. 6 and 12, for example, when trying to connect to the first AP, the first terminal connects to the first AP and then transmits the request message inquiring about the first AP information and the rogue AP to the first Internet server over the IP network.

FIG. 13 illustrates a request message according to an embodiment of the present disclosure.

Referring to FIG. 13, in response to the request message, the first Internet server compares the first AP information and the rogue AP information stored in the first DB, determines whether the first AP is the rogue AP, generates the response message, and transmits the response message to the first terminal. The request message, which is the connected AP information, includes Uniform Resource Locator (URL) information, such as ClientVersion and MacAddresses.

FIG. 14 illustrates a response message according to an embodiment of the present disclosure.

Referring to FIG. 14, the response message includes, for example, resultCode for notifying whether the connected AP is the rogue AP, resultMessage, BSSID, and Severity. The response message may include one or more of a warning message for notifying the rogue AP and a command for disconnecting from the rogue AP.

The first terminal may display the warning message in response to the response message, or disconnect from the first AP in response to the command of the response message. When determining based on the response message that the first AP is not the rogue AP, the first terminal maintains the connection to the first AP and performs an operation requested by the user over the IP network.

FIG. 15 illustrates AP information transmitted to an Internet server according to an embodiment of the present disclosure.

Referring to FIG. 15, over the IP network, the first terminal provides the second Internet server with the first AP information and the other AP information obtained by scanning the connection target. The first AP information provided to the second Internet server can include, for example, BSSID, HiddenSSID, IP address, LinkSpeed, MacAddress, Received Signal Strength Indicator (RSSI), SSID, and supplicantState.

FIG. 16 illustrates other AP information transmitted to an Internet server according to an embodiment of the present disclosure.

Referring to FIG. 16, the other AP information provided to the second Internet server can include, for example, BSSID, SSID, capabilities, frequency, level, and timestamp. The second Internet server collects the AP information from the first terminal and stores them in the second DB. The second DB, which is the AP DB, can collect and store the AP information as stated in FIG. 8.

The second Internet server analyzes the AP information stored in the AP DB, retrieves the rogue AP information, and then transmits the rogue AP information to the first Internet server. The first Internet server stores and manages the rogue AP information in the first DB. The first DB, which is the rogue AP DB, stores the rogue AP information provided from the second Internet server as described in FIG. 11.

The first Internet server may analyze the AP information received from the second Internet server, retrieve the rogue AP information, and store and manage the rogue AP information in the rogue AP DB. Meanwhile, to attempt the connection to the second AP, the second terminal connects to the second AP and transmits the request message inquiring about the second AP information and the rogue AP to the first Internet server over the IP network.

The first Internet server compares the second AP information and the rogue AP information stored in the first DB, determines whether the second AP is the rogue AP, generates the corresponding response message, and then transmits the response message to the second terminal. The second terminal may display the warning message based on the response message, or disconnect from the second AP based on the command of the response message.

When determining that the second AP is the rogue AP based on the response message, the second terminal disconnects from the second AP and attempts the connection to other AP. The second terminal stores information for identifying the second AP being the rogue AP in its memory and then excludes the second AP from the connection target so that it is not reconnected to the rogue AP.

Hence, the first terminal and the second terminal can efficiently disconnect from the rogue AP by interfacing with the first Internet server. When the first terminal and the second terminal are connected to the normal AP over the IP network, they provide the other nearby AP information to the second Internet server. Thus, the second Internet server can efficiently collect the AP information, and the first Internet server can efficiently update the rogue AP information.

Figure 17:
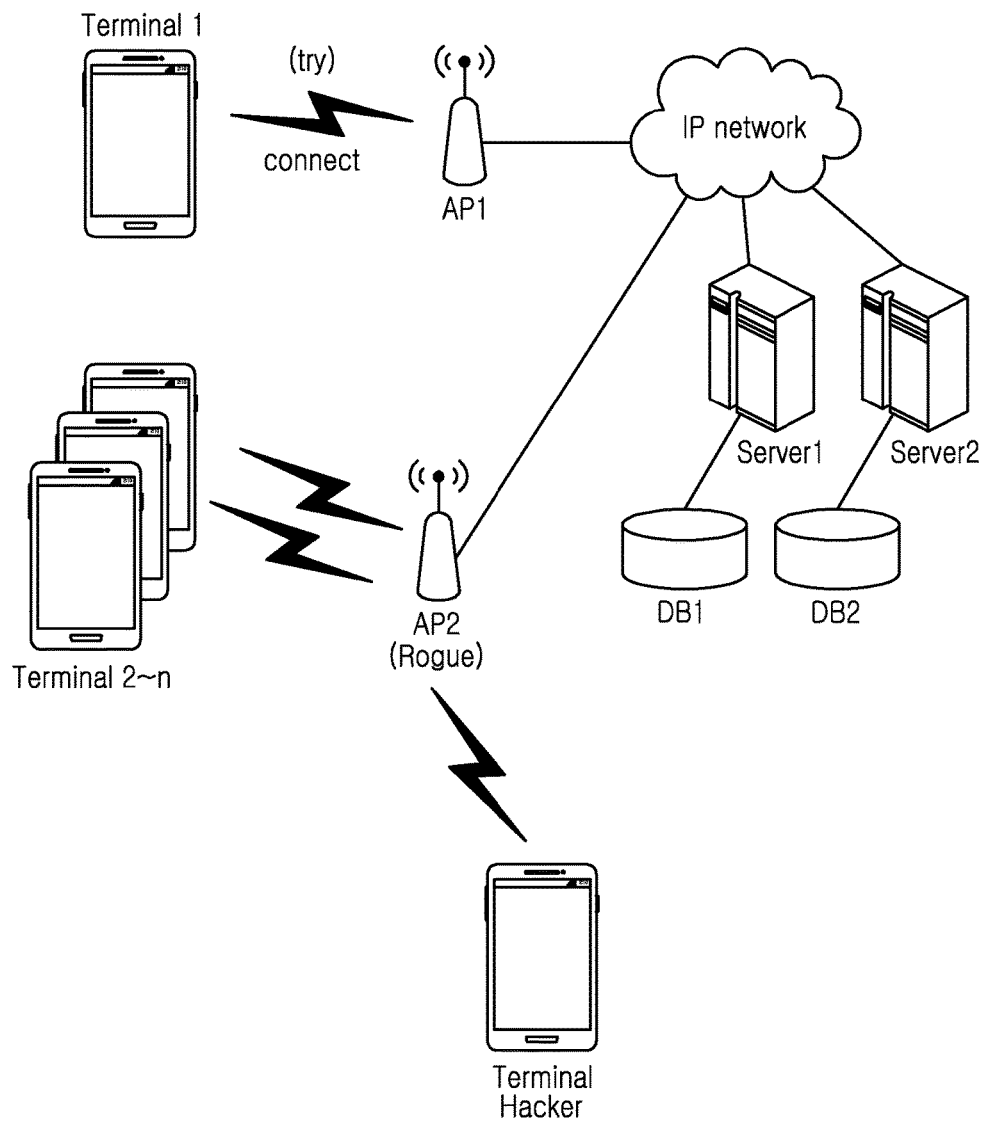
FIG. 17 illustrates an electronic device for attempting to connect to a normal AP according to an embodiment of the present disclosure.

FIG. 17 illustrates an electronic device for attempting to connect to a normal AP according to an embodiment of the present disclosure.

Figure 18:
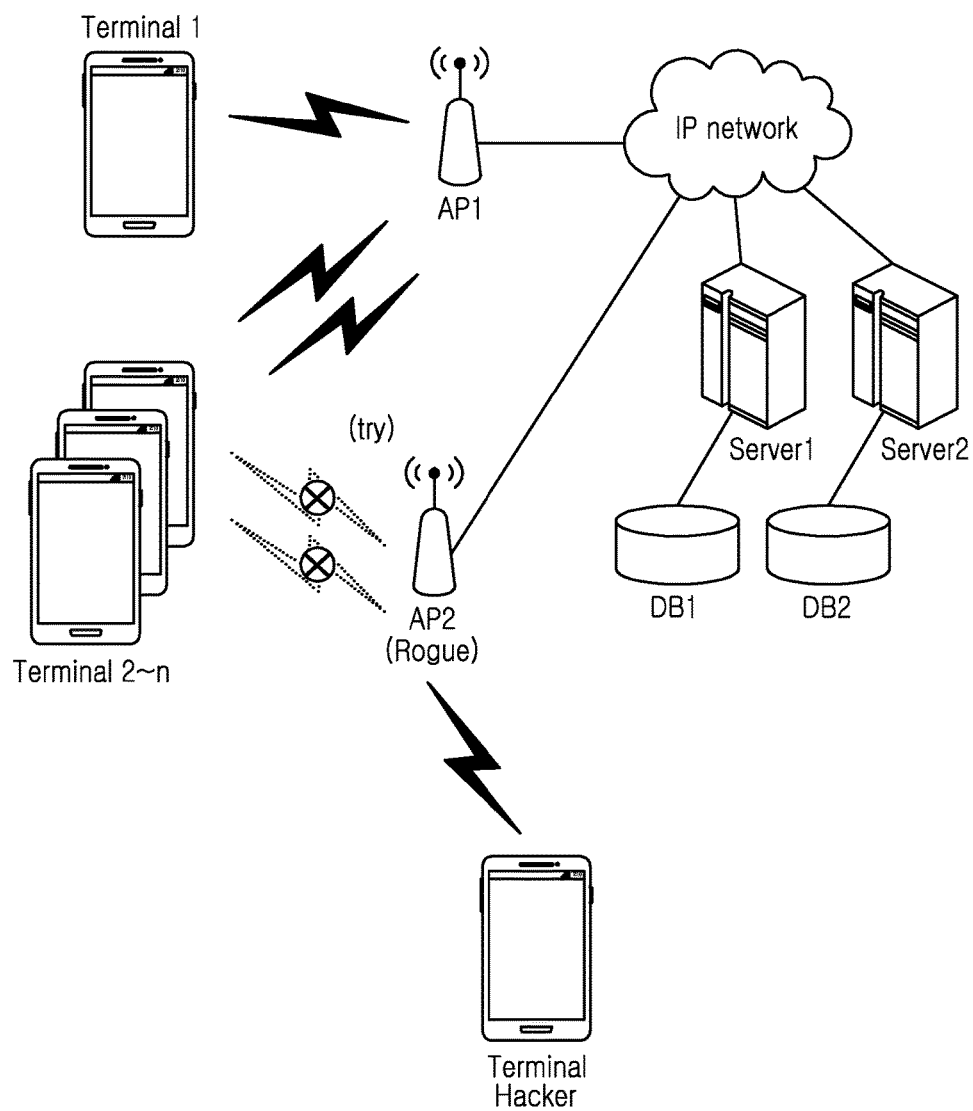
FIG. 18 illustrates a plurality of electronic devices disconnected from a rogue AP according to an embodiment of the present disclosure.

FIG. 18 illustrates a plurality of electronic devices disconnected from a rogue AP according to an embodiment of the present disclosure.

Figure 19:
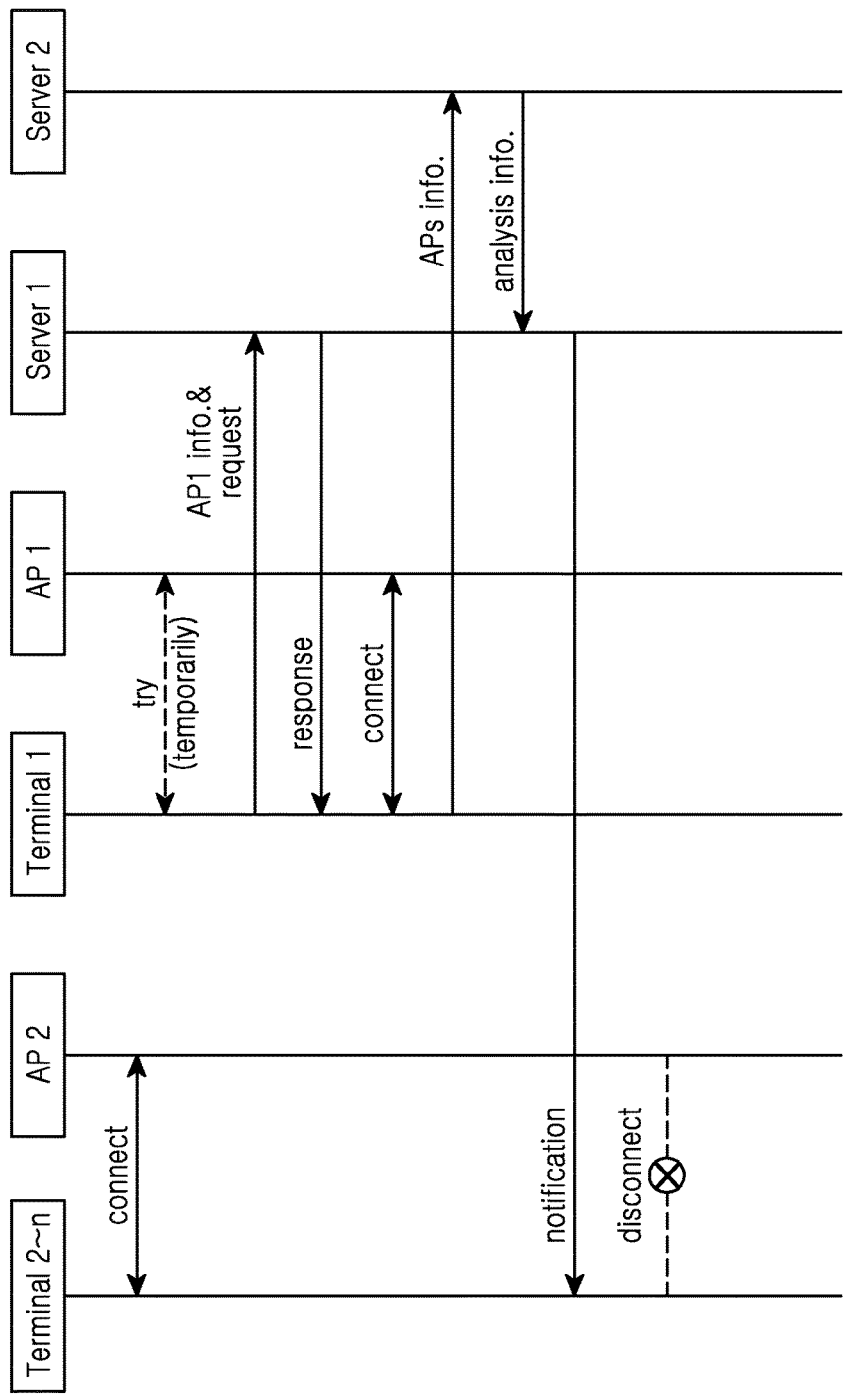
FIG. 19 illustrates a plurality of electronic devices disconnected from a rogue AP according to an embodiment of the present disclosure.

FIG. 19 illustrates a plurality of electronic devices disconnected from a rogue AP according to an embodiment of the present disclosure.

Referring to FIGS. 17, 18, and 19, a first terminal attempts to connect to a first normal AP in vicinity, and second through n-th terminals can be already connected to a second AP which is the rogue AP.

The first terminal transmits the first AP information and the request message inquiring about whether the first AP is the rogue AP, to the first Internet server. The first Internet server compares the first AP information with the rogue AP information stored in a first DB, and then generates and transmits the response message to the first terminal.

When determining based on the response message that the first AP is not the rogue AP, the first terminal maintains the connection to the first AP and operates as requested by the user over the IP network. When maintaining the connection to the first AP, the first terminal provides the second Internet server with the first AP information and the other AP information obtained by scanning the connection target.

The second Internet server collects the first AP information received from the first terminal and the other AP information, and stores and manages them in the second DB. The second DB, which is the AP DB, can collect and store the AP information as explained in FIG. 8. The second Internet server extracts the rogue AP information by analyzing the AP information stored in the AP DB, and then transmits the rogue AP information to the first Internet server.

The first Internet server stores and manages the rogue AP information in the first DB. The first DB, which is the rogue AP DB, can store the rogue AP information received from the second Internet server as described in FIG. 11. The first Internet server may extract the rogue AP information by analyzing the AP information received from the second Internet server, and then store and manage the rogue AP information in the rogue AP DB.

The first Internet server confirms the rogue AP information stored and updated, and identifies a new rogue AP. For example, when the new rogue AP is the second AP already connected to the second through n-th terminals, the first Internet server may transmits the warning message to the terminals or remotely disconnect them from the rogue AP.

Figure 20:
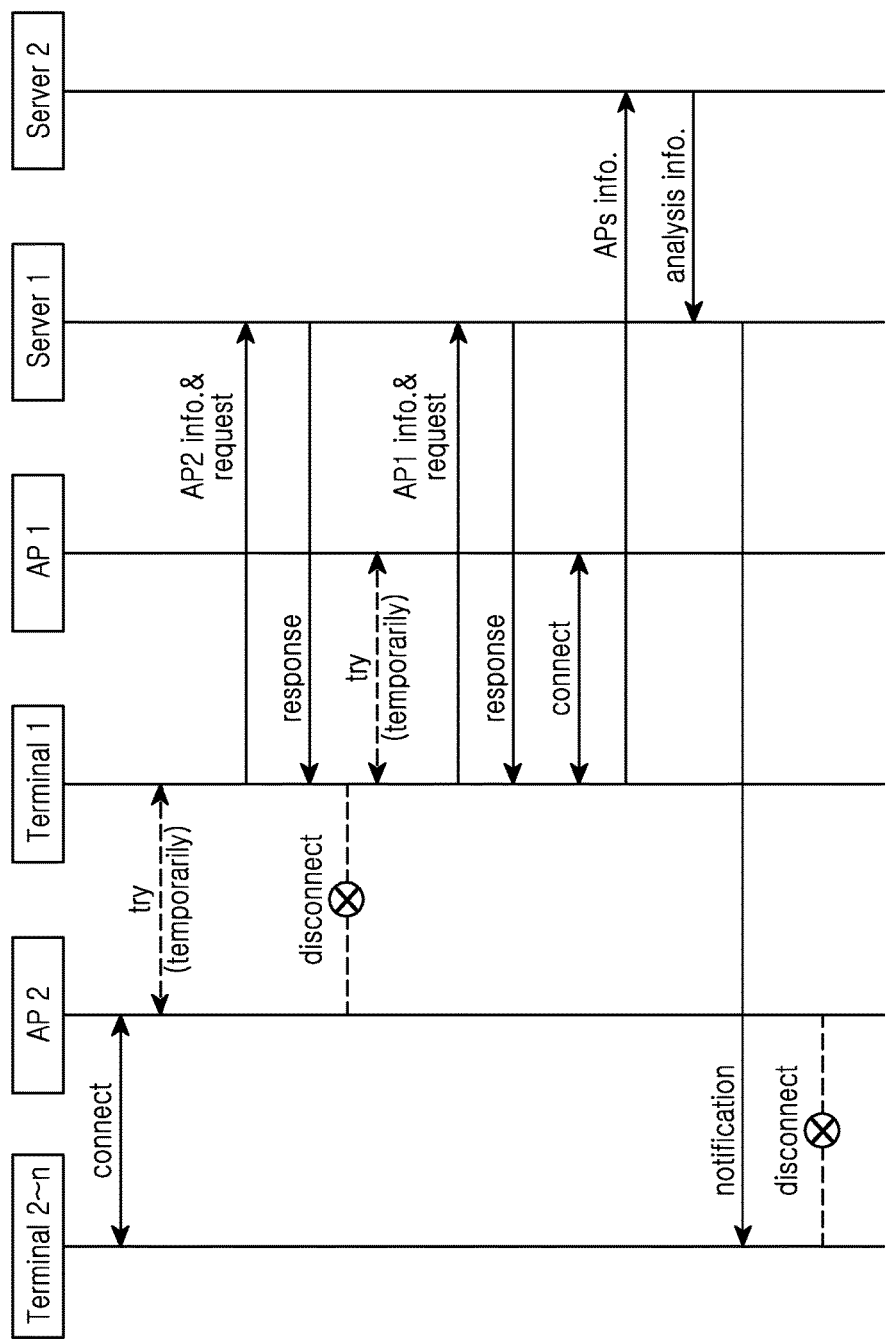
FIG. 20 illustrates a plurality of electronic devices disconnected from a rogue AP according to an embodiment of the present disclosure.

FIG. 20 illustrates a plurality of electronic devices disconnected from a rogue AP according to an embodiment of the present disclosure.

Referring to FIG. 20, the first terminal can disconnect from the second AP being the rogue AP, and connect to the first normal AP over the IP network.

The first terminal provides the second Internet server with the other nearby AP information obtained by scanning the connection target. The second Internet server collects the AP information from the first terminal, and store and manage them in the second DB. The first Internet server stores and manages in the first DB the rogue AP information extracted and analyzed from the AP information stored in the second DB, confirms the rogue AP information stored and updated, and identifies the new rogue AP.

For example, when the new rogue AP is the second AP already connected to the second through n-th terminals, the first Internet server may transmits the warning message to the terminals or remotely disconnect them from the rogue AP.

Figure 21:
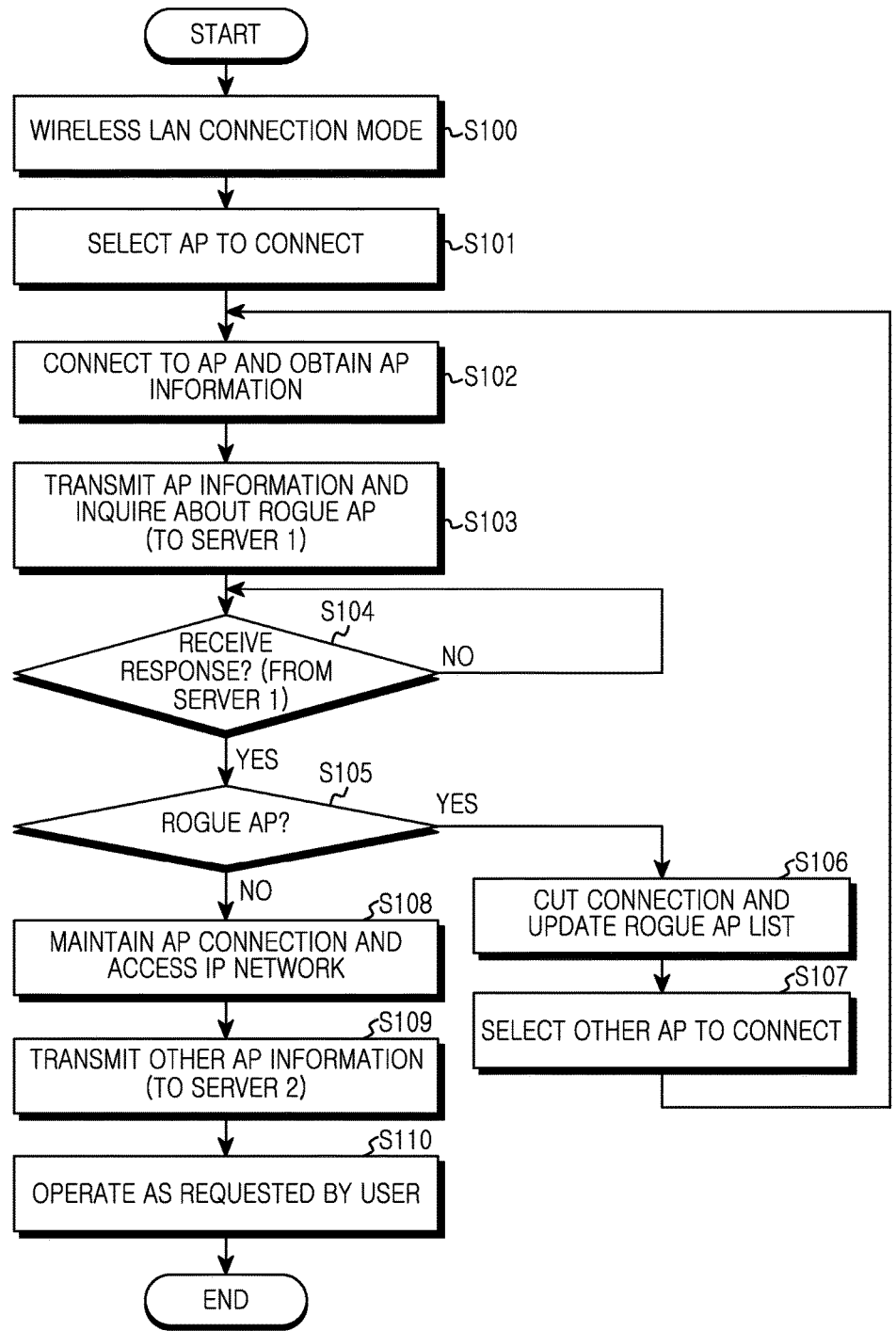
FIG. 21 is a flowchart of a method for connecting to an AP in an electronic device according to an embodiment of the present disclosure.

FIG. 21 is a flowchart of a method for connecting to an AP in an electronic device according to an embodiment of the present disclosure. For example, the electronic device, such as a smart phone or a tablet PC, can be constructed as shown in FIG. 4.

Referring to FIG. 21, for example, in a wireless LAN connection mode according to the user request in operation 100, the processor 210 of the electronic device of FIG. 4 selects one of the APs of the effective SSID and the high signal level, as the AP to connect in operation 101.

The processor 210 controls the communication module 230 to wirelessly connect to the selected AP and to obtain the AP information in operation 102, and to transmit the obtained AP information to the first Internet server over the IP network. In so doing, the processor 210 transmits the request message inquiring about whether the AP is the rogue AP, to the first Internet server in operation 103. When receiving the response message from the first Internet server in operation 104, the processor 210 determines based on the rogue information of the response message whether the AP connected through the communication module is the rogue AP in operation 105.

For example, when the AP is the rogue AP, the processor 210 controls the communication module 230 to disconnect from the connected AP, and stores and updates the rogue AP information in the rogue AP list of the memory in operation 106.

The processor 210 selects an AP other than the rogue APs stored and updated in the rogue AP list, and then controls the communication module 230 to attempt to connect to the selected AP in operation 107. By contrast, when the AP is not the rogue AP, the processor 210 maintains the connection with the AP and then accesses to the IP network in operation 108.

In operation 109, the processor 210 provides the second Internet server connected over the IP network with the connected AP information and the other nearby AP information obtained by scanning the connection target. In operation 110, the processor 210 operates as requested by the user. Hence, the connection to the rogue AP is cut. In addition, the second Internet server can efficiently collect and update the AP information of the big data and the short generation period.

The first Internet server can enhance reliability of the rogue AP determination by analyzing and extracting the rogue AP information from various AP information collected and updated, and transmit the warning message to other electronic devices already connected to the rogue AP.

Figure 22:
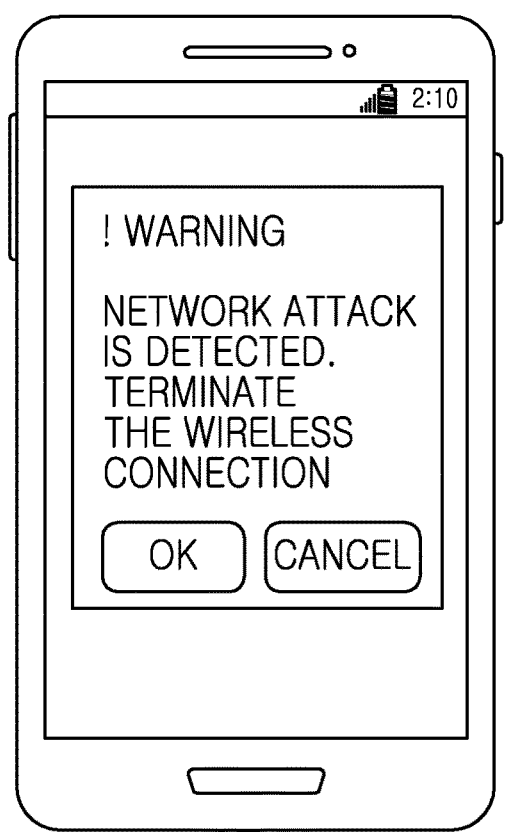
FIG. 22 illustrates a warning message displayed on a screen of an electronic device according to an embodiment of the present disclosure.

FIG. 22 illustrates a warning message displayed on a screen of an electronic device according to an embodiment of the present disclosure.

Referring to FIG. 22, the warning message can display a text informing that the current AP is the rogue AP, or a touch button for immediately disconnecting from the rogue AP. Further, the warning message may display a text indicating the forced disconnection from the rogue AP, and a button for confirming or cancelling the disconnection.

When attempting to connect to the AP, the electronic device, such as a smart phone or a tablet PC, can efficiently determine whether the connected AP is the rogue AP illegally installed, and disconnect from the rogue AP.

When the electronic device is connected to the IP network via the normal AP, the electronic device provides the other nearby AP information to the Internet server so that the Internet server can efficiently collect and analyze the rogue AP information. Further, the Internet server can provide the warning message to the other electronic devices already connected to the rogue AP, or remotely disconnect them from the rogue AP.

The methods as described in the claims and/or the specification of various embodiments of the present disclosure can be implemented using hardware, software, or a combination of them. As for the software, a computer-readable storage medium including one or more programs (software modules) may be provided. One or more programs stored in the computer-readable storage medium may be configured for execution by one or more processors of an electronic device. One or more programs include instructions for controlling the electronic device to execute the methods according to the various embodiments as described in the claims and/or the specification of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for connecting to a secure network with authorization from a local network administrator, the electronic device comprising:
    a communication module configured to connect to an Access Point (AP); and
    a processor, operatively coupled to the communication module, configured to:
        control to scan access points (APs) around the electronic device; control to connect to the first AP among the scanned APs;
        transmit, to another electronic device via the first AP, a first message for requesting whether the first AP is a rogue AP without authorization or a normal AP with authorization, wherein the first message comprises information regarding the first AP;
        receive, from the other electronic device via the first AP, a second message indicating whether the first AP is determined to be a normal AP or a rogue AP by the other electronic device; and
        if it is determined that the first AP is the normal AP based on the received second message, maintain connection with the first AP and transmit, to the other electronic device via the first AP, a third message comprising information regarding at least one other AP among the scanned APs,
    wherein the other electronic device is configured to establish a rogue AP database (DB) by determining whether the at least one other AP is the rogue AP or the normal AP using the information regarding the at least one other AP, and
    wherein the information of the third message comprises at least one of Internet Protocol (IP) address, Gateway, and Data Source Name (DSN).

2. The electronic device of claim 1, wherein the first message comprises, as the AP information, Uniform Resource Locator (URL) information comprising one or more ClientVersion and MacAddress.

3. The electronic device of claim 1, wherein the second message comprises at least one of a resultCode for notifying whether the connected AP is the rogue AP or the normal AP, a resultMessage, and a severity.

4. The electronic device of claim 1, wherein the processor is further configured to:
    based on the received second message, if it is determined that the first AP is the rogue AP, control to disconnect from the first AP; and
    control to connect to a second AP among the scanned APs.

5. The electronic device of claim 4,
    wherein the second message further comprises at least one of a warning message for notifying that the electronic device is connected to the rogue AP and a command for disconnecting from the rogue AP, if it is determined that the first AP is the rogue AP by the other electronic device.

6. The electronic device of claim 4, wherein, when disconnecting from the first AP, the processor is further configured to store the information regarding the first AP as rogue AP information and to exclude the first AP from a connection target.

7. The electronic device of claim 1,
wherein the other electronic device comprises a first server and a second server,
wherein the first server analyzes and stores rogue AP information in the rogue AP DataBase (DB), and
wherein the second server collects and stores AP information in a normal AP DB.

8. The electronic device of claim 7, wherein the rogue AP DB stores at least one of a Basic Service Set Identifier (BSSID), a SSID, a ClientVersion, a severity, and an updateTimeStamp of the rogue AP.

9. The electronic device of claim 1, wherein the other electronic device is configured to:
determine, in response to receiving the third message, whether the at least one other AP is a rogue AP or a normal AP based on the information regarding the at least one other AP; and
store, in response to determining that the at least one other AP is a rogue AP, the information regarding the at least one other AP as rogue AP information for indicating that the at least one other AP is a rogue AP in at least one database included in the other electronic device.

10. An electronic device comprising:
at least one database; and
a processor, operatively coupled to the at least one database, configured to:
control to receive, from a first electronic device via a first Access Point (AP) connected to the first electronic device, a first message for requesting whether the first AP is a rogue AP without authorization or a normal AP with authorization, wherein the first message comprises information regarding the first AP;
determine whether the first AP is a rogue AP or a normal AP based on comparing the information regarding the first AP with rogue AP information stored in the at least one database;
control to transmit, if the first AP is determined to be a normal AP, a second message for requesting information regarding at least one other AP which is scanned by the electronic device, to the first electronic device;
control to receive, from the first electronic device, a third message comprising the information regarding the at least one other AP;
determine, based on the information regarding the at least one other AP, whether the at least one other AP is a rogue AP or a normal AP;
store, in response to the determination that the at least one other AP is a rogue AP, the information regarding the at least one other AP as rogue AP information in the at least one database; and
control to transmit, if the first AP or the at least one other AP is determined to be a rogue AP, a warning message for notifying a connection with the rogue AP to a second electronic device connected to the rogue AP, and disconnect the second electronic device from the rogue AP,
wherein the information of the third message comprises at least one of Internet Protocol (IP) address, Gateway, and Data Source Name (DSN).

11. The electronic device of claim 10, wherein the processor is further configured to:
transmit, if the first AP is determined to be a rogue AP, a warning message for notifying of connection with rogue AP to the second electronic device connected to the second AP, and
disconnect the second electronic device from the second AP.

12. The electronic device of claim 10, wherein the first message comprises, as the rogue AP information, Uniform Resource Locator (URL) information comprising one or more ClientVersion and MacAddress.

13. The electronic device of claim 10, wherein the second message comprises at least one of:
a resultCode for notifying whether the connected AP is the rogue AP,
a resultMessage, or
a severity.

14. The electronic device of claim 10, wherein the second message, in response to the determination that the first AP is a rogue AP, comprises at least one of:
a warning message for notifying that the electronic device is connected to the rogue AP, or
a command for disconnecting from the rogue AP.

15. The electronic device of claim 10,
wherein the electronic device comprises:
a first server, and
a second server,
wherein the first server is configured to analyze and store rogue AP information in a rogue AP DataBase (DB), and
wherein the second server is configured to collect and store AP information in an AP DB.

16. The electronic device of claim 15, wherein the rogue AP DB stores at least one of a Basic Service Set Identifier (BSSID), a SSID, a ClientVersion, a severity, and an updateTimeStamp of the rogue AP.

* * * * *